(12) United States Patent
Colven et al.

(10) Patent No.: US 7,907,549 B2
(45) Date of Patent: Mar. 15, 2011

(54) MODELING A RING NETWORK USING A RING OBJECT

(75) Inventors: David M. Colven, Dallas, TX (US); Li-Chang J. Lin, New Hempstead, NY (US); Snigdho C. Bardalai, Plano, TX (US); Abed M. Jaber, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1580 days.

(21) Appl. No.: 11/183,151

(22) Filed: Jul. 14, 2005

(65) Prior Publication Data

US 2007/0014250 A1 Jan. 18, 2007

(51) Int. Cl.
*H04L 12/28* (2006.01)
(52) U.S. Cl. .......................... 370/258; 370/223; 370/296
(58) Field of Classification Search .................. 370/403, 370/404, 405, 406, 252, 254, 216, 222, 223, 370/224, 352, 258, 434, 909, 351, 388; 714/717; 709/200, 203; 398/1–5, 7
See application file for complete search history.

(56) References Cited

U.S. PATENT DOCUMENTS

| | | | | | |
|---|---|---|---|---|---|
| 5,305,306 | A | * | 4/1994 | Spinney et al. | 370/296 |
| 5,982,747 | A | * | 11/1999 | Ramfelt et al. | 370/224 |
| 6,233,704 | B1 | * | 5/2001 | Scott et al. | 714/717 |
| 6,819,662 | B1 | * | 11/2004 | Grover et al. | 370/351 |
| 7,099,287 | B1 | * | 8/2006 | Oz et al. | 370/258 |
| 7,155,120 | B1 | * | 12/2006 | Ofek et al. | 398/7 |
| 7,310,333 | B1 | * | 12/2007 | Conklin et al. | 370/388 |
| 7,388,830 | B1 | * | 6/2008 | Oz et al. | 370/222 |
| 2003/0048747 | A1 | * | 3/2003 | Tazawa et al. | 370/223 |
| 2003/0072259 | A1 | * | 4/2003 | Mor | 370/223 |
| 2007/0071442 | A1 | * | 3/2007 | Lu | 398/59 |

OTHER PUBLICATIONS

Schroeder et al., Autonet: a high-speed, self-configuring local area network using point-to-point links, IEEE Journal, vol. 9, Issue 8, Oct. 1991.*
Nortel Networks, "*OPTera Packet Edge System for native Ethernet and IP services over SONET networks*", Nortel Networks Product/Service Information, pp. 1-40, Mar. 10, 2001.
Nortel Networks, "*Key benefits of Nortel Networks OPTera metro 3500 Next-generation SONET platform in digital/optical cross-connect applications*", Nortel Networks Technical Bulletin, pp. 1-12, 2003.
Cisco Systems, "*Cisco Multiservice over SONET/SDH*", Cisco Systems Product Migration and Strategy, pp. 1-24, Aug. 2003.
Cisco ONS 15454 SONET/SDH ML, "*Series Multilayer Ethernet Card Software Feature and Configuration Guide, R4.6*", Cisco Overview, pp. 1-10, Feb. 2005.
Cisco ONS 15310-CL, "*Ethernet Card Software Feature and Configuration Guide, R5.0*", Cisco, Configuring Resilient Packet Ring on ML-Series Card, pp. 1-10, Mar. 2005.

* cited by examiner

*Primary Examiner* — Dang T Ton
*Assistant Examiner* — Mohamed Kamara
(74) *Attorney, Agent, or Firm* — Baker Botts L.L.P.

(57) ABSTRACT

Modeling a ring network of a network system includes creating a ring object that models the ring network. The network system includes a network element that has components. The ring object includes provisioning properties, where a provisioning property describes configuring a component to become a member of the ring network. A component is associated with the ring object to allow the component to become a member of the ring network, where the associated component is allowed to receive packets communicated by the ring network. The ring object is stored at memory of the network element.

20 Claims, 3 Drawing Sheets

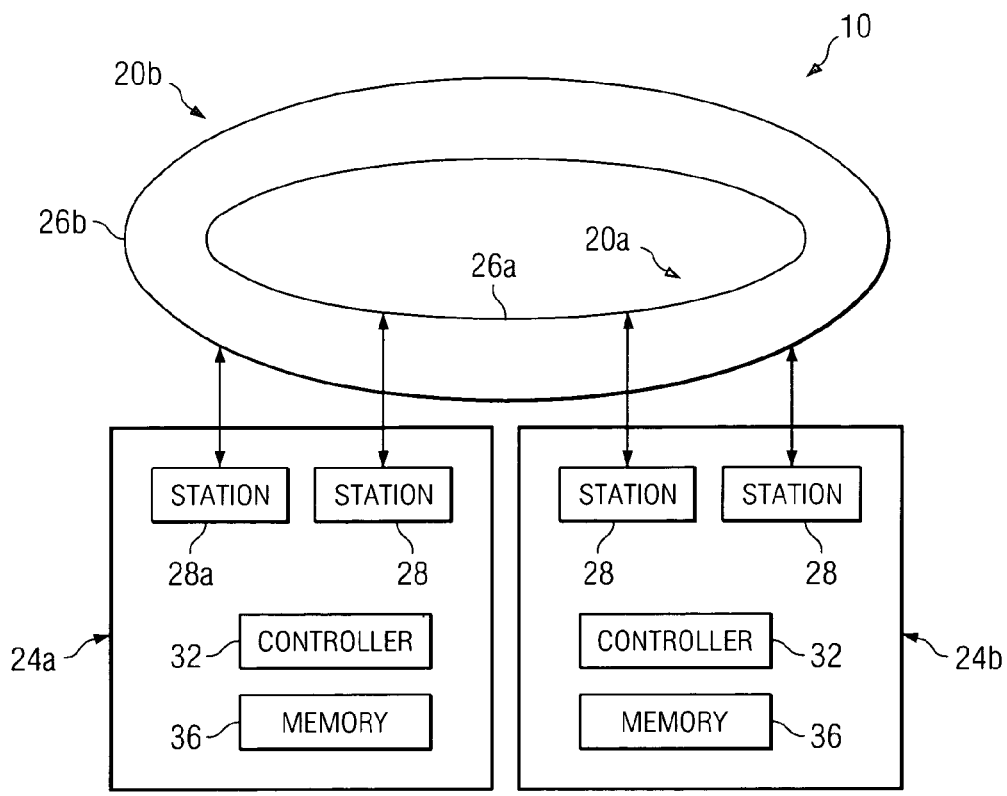
*FIG. 1*
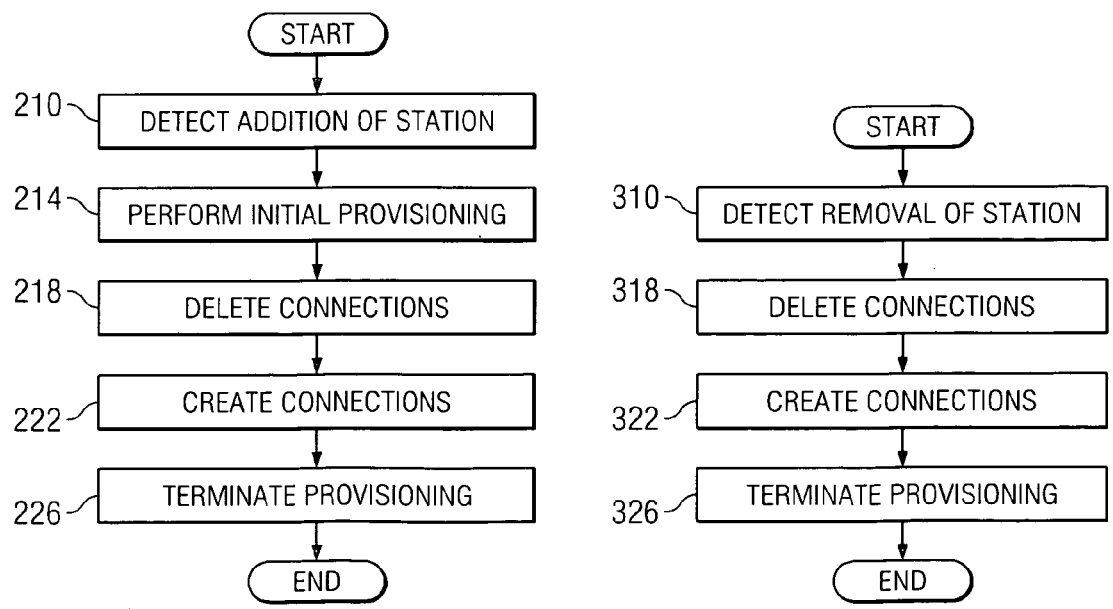
*FIG. 4*     *FIG. 5*

US 7,907,549 B2

MODELING A RING NETWORK USING A RING OBJECT

TECHNICAL FIELD

This invention relates generally to the field of optical networks and more specifically to modeling a ring network using a ring object.

BACKGROUND

A communication network includes network elements that route packets through the network. Connections among the components of a network element are managed in order to properly route the packets. As an example, when a component of a network element is added or removed, the connections are re-established in order to properly route packets with the added or removed component.

Known techniques for managing connections of a network element include manually entering the connections for the network element. These known techniques, however, may be inefficient in certain situations. It is generally desirable to have efficient methods for managing connections of network elements.

SUMMARY OF THE DISCLOSURE

In accordance with the present invention, disadvantages and problems associated with previous techniques for managing connections may be reduced or eliminated.

According to one embodiment of the present invention, modeling a ring network of a network system includes creating a ring object that models the ring network. The network system includes a network element that has components. The ring object includes provisioning properties, where a provisioning property describes configuring a component to become a member of the ring network. A component is associated with the ring object to allow the component to become a member of the ring network, where the associated component is allowed to receive packets communicated by the ring network. The ring object is stored at memory of the network element.

Certain embodiments of the invention may provide one or more technical advantages. A technical advantage of one embodiment may be that a ring network may be modeled by a ring object that is stored at a node of the ring network. Modeling a ring network by a ring object may provide for more efficient provisioning of network elements. In addition, the ring object may provide for more efficient identification of problems with the ring network. Furthermore, the ring object may provide for more efficient gathering and reporting of statistics describing the ring network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating a network system that includes embodiments of ring networks that may be modeled by ring objects;

FIG. 4 is a flowchart illustrating one embodiment of a method of managing connections in response to the addition of a component to a network element that may be used with the network element of FIG. 3; and FIG. 5 is a flowchart illustrating one embodiment of a method of managing connections in response to the removal of a component from a network element that may be used with the network element of FIG. 3.

DETAILED DESCRIPTION OF THE DRAWINGS

Figure 2:
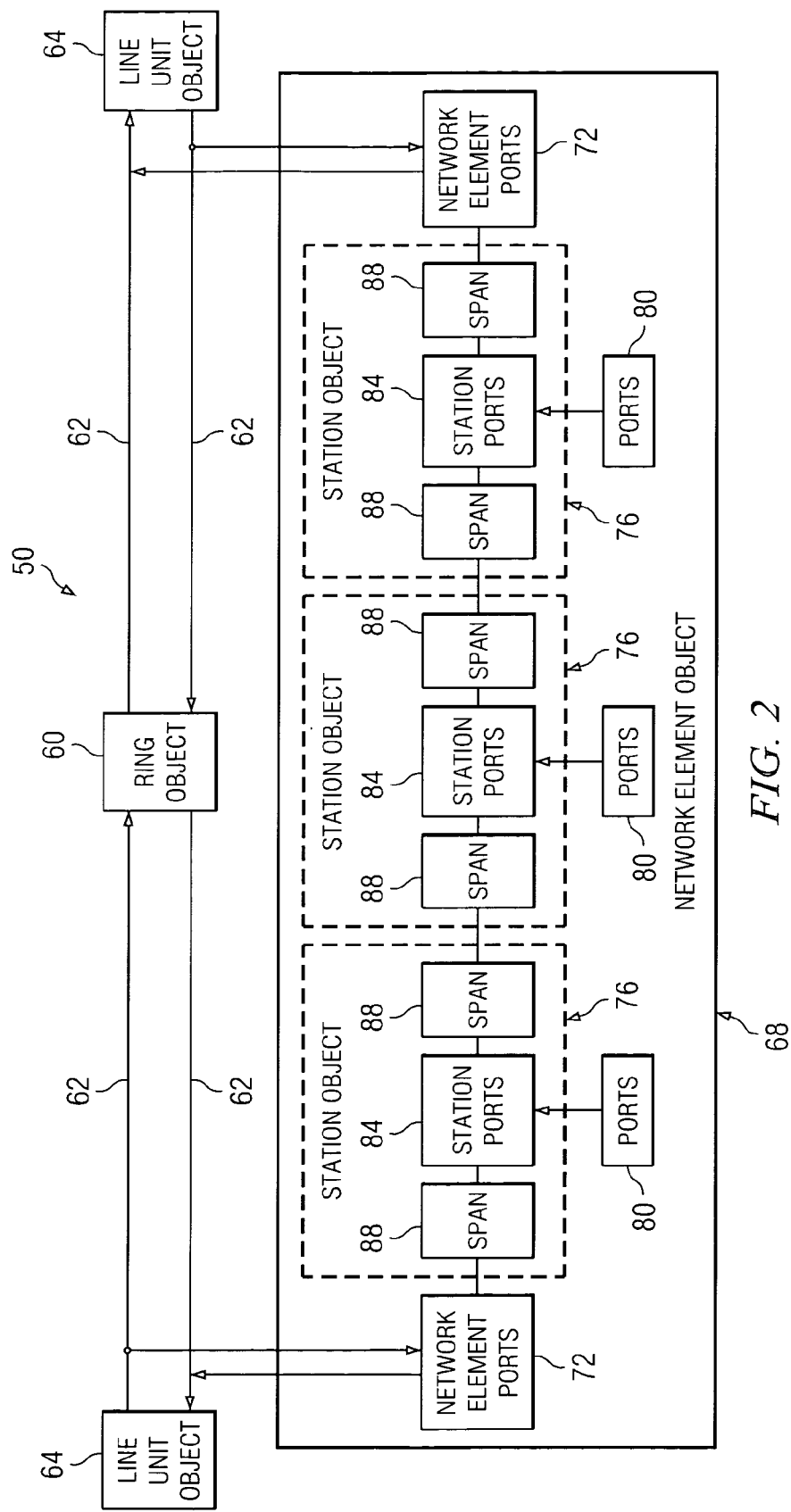
FIG. 2 is a block diagram illustrating one embodiment of a model of a ring network.

Embodiments of the present invention and its advantages are best understood by referring to FIGS. 1 through 5 of the drawings, like numerals being used for like and corresponding parts of the various drawings.

FIG. 1 is a block diagram illustrating a network system 10 that includes embodiments of ring networks that may be modeled by ring objects. A ring object may be used to model a ring network to provide for more efficient management of the connections of network elements of the ring network. Moreover, a network element of the ring network may include a controller that automatically manages connections of the network element.

According to the illustrated embodiment, network system 10 communicates information through signals. A signal may refer to an optical signal transmitted as light pulses. As an example, an optical signal may have a frequency of approximately 1550 nanometers and a data rate of 10, 20, 40, or over 40 gigabits per second. A signal may communicate information in packets. A packet may comprise a bundle of data organized in a specific way for transmission, and a frame may comprise the payload of one or more packets organized in a specific way for transmission. A packet may carry any suitable information such as voice, data, audio, video, multimedia, control, signaling, other information, or any combination of the preceding. The packets may comprise any suitable multiplexed packets, such as time division multiplexed (TDM) packets.

According to the illustrated embodiment, network system 10 includes one or more ring networks 20. A ring network may refer to a network of communication devices that has a ring topology. According to one embodiment, ring network 20 may comprise an optical fiber ring. Ring network 20 may utilize protocols such as a resilient packet ring (RPR) protocol. An RPR protocol may refer to a protocol for ring-based frame/packet transport, where frames/packets are added, passed through, or dropped at each node/station. According to one embodiment, ring network 20 may utilize RPR/Ethernet or RPR/Synchronous Optical Network (SONET).

A ring network 20 may include network elements 24 coupled by fibers 26 as shown. A network element 24 may include any suitable device operable to route packets to or from ring network 20. Examples of network elements 24 include dense wavelength division multiplexers (DWDMs), access gateways, endpoints, softswitch servers, trunk gateways, access service providers, Internet service providers, or other device operable to route packets to or from ring network 20.

According to the illustrated embodiment, network element 24 includes components such as one or more stations 28, a controller 32, and a memory 36. A station 28 may represent a component operable to add packets to or drop packets from ring network 20. According to one embodiment, station 28 may comprise an RPR station, and may be embodied in a card that may be added to or removed from network element 24. Station 28 has one or more ports, for example, one or more ports.

Controller 32 controls the operation of network element 24. According to one embodiment, controller 32 manages the connections between the components of network element 24. A connection may refer to a path from a first component to a second component along which packets may be communicated.

According to the embodiment, controller 32 establishes whether a connection initiation event has occurred, and manages connections of network element 24 in response to the event. A connection initiation event may refer to an event, such as the addition or removal of a component, that initiates a deletion or creation or both deletion and creation of one or more connections. As an example, a connection initiation event may refer to the addition or removal a station 28, a switch, or other component.

"Addition of a component" may refer to any suitable point of the process when a component is added. As an example, a component may be regarded as added when the interfaces of the component are coupled to appropriate interfaces of network element 24. As another example, a component may be regarded added when the component is activated after the appropriate interfaces have been coupled. "Removal of a component" may refer to any suitable point of the process when a component is removed. As an example, a component may be regarded as removed when the interfaces of the component are decoupled from appropriate interfaces of network element 24. As another example, a component may be regarded as removed when the component is deactivated, even if the appropriate interfaces are coupled. As another example, a component may be regarded removed when the component fails to properly communicate packets, such as when the component experiences a failure.

Controller 32 automatically manages connections of network element 24 in response to a connection initiation event. As a first example, controller 32 may provision network element 24 when a component is added to network element 24. As a second example, controller 32 may delete and create connections so a component may be removed from network element 24. As a third example, controller 32 may reroute packets to bypass a failed component. Controller 32 may manage connections of network element 24 according to any suitable method. Example methods are described with reference to FIGS. 4 and 5.

Memory 36 stores information used by controller 32. "Memory" may refer to any structure operable to store and facilitate retrieval of information used by controller 32, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to one embodiment, memory 36 may store information about the portion of ring network 20 coupled to network element 24. Components of network element 24 that are members of a particular ring network 20 may be associated with a ring object that models the ring network 20. For example, station 28a of ring network 20b may be associated with the ring object that models ring network 20b to indicate that station 28a is a member of ring network 20b.

A ring object includes provisioning properties that describe how the members of ring network 20 are to be provisioned. Properties may include, for example, bandwidth and encapsulation properties.

The ring object may be used for any suitable purpose. According to one embodiment, since the members of ring network 20 are associated with a ring object, information about ring network 20 may be readily reported using the associated ring object. As an example, a problem with a member of a ring network 20 may be reported using the associated ring object. A problem may comprise, for example, a failure of a member. As another example, statistics for ring network 20 may be generated and reported according to the associated ring object. Statistics may refer to data describing the performance of ring network 20. Example statistics may include data flow rate, amount and type of failures, information transported, data usage, other data, or any combination of the preceding.

Fibers 26 may refer to any suitable fiber operable to transmit a signal. According to one embodiment, a fiber 26 may represent an optical fiber. An optical fiber typically comprises a cable made of silica glass or plastic. The cable may have an outer cladding material around an inner core. The inner core may have a slightly higher index of refraction than the outer cladding material. The refractive characteristics of the fiber operate to retain a light signal inside of the fiber.

A ring network 20 may have any suitable number of fibers 26, for example, two fibers 26. As an example, the first fiber 26 traverses a ring network 20 in one direction, and the second fiber traverses ring network 20 in the other direction. A ring segment may refer to the portion of fibers 26 between network elements 24, and may be designated by the specific ports of network elements coupled by the ring segment.

A component of network system 10 may include an interface, logic, memory, other component, or any suitable combination of the preceding. "Interface" may refer to any suitable structure of a device operable to receive input for the device, send output from the device, perform suitable processing of the input or output or both, or any combination of the preceding, and may comprise one or more ports, conversion software, or both.

"Logic" may refer to hardware, software, other logic, or a combination of the preceding. Logic manages the operation of a device, and may comprise, for example, a processor. "Processor" may refer to any suitable device operable to execute instructions and manipulate data to perform operations.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

FIG. 2 is a block diagram illustrating one embodiment of a model 50 of ring network 20. Model 50 includes member objects that represent the members of ring network 20. Each member object may have an identifier that uniquely identifies the member object. According to the illustrated embodiment, model 50 includes a ring object 60, one or more fiber segment objects 62, one or more line unit objects 64, and a network element object 68.

A ring object 60 models a ring network 20. Ring object 60 may include fiber segment objects 62, where a fiber segment object 62 represents a fiber segment. A line unit object 64 represents a line unit of ring network 20. A line unit may refer to an interface device between a fiber 26 of ring network 20 and a network element 24 of ring network 20.

Network element object 68 represents a network element 24 of ring network 20. Network element object 68 includes component objects such as network element ports 72, one or more station objects 76, and device ports 80 coupled as shown. Network element ports 72 represent the ports of a network element 24. Station object 76 represents a station 28 of network element 24. According to the illustrated embodiment, a station object 76 includes station ports 84 and station spans 88. Station ports 84 represent the ports of a station 28, and may be designated by the port identifiers of the ports of station 28. Spans 88 represent the connections between station 28 and other components of network element 24. Ports 80 represent the ports of devices that access station 28, and may be designated by the ports identifiers of the ports.

A component of network element 24 may become a member of ring network 20 by associating a component object representing the component with at least a portion of ring object 60, such as a member object of ring object 60. As an example, a network element 24 may become a member of ring network 20 by associating the network element object 68 representing the network element 24 with a span 88 of ring object 60. As another example, a station 28 may become a member of ring network 20 by associating the station object 76 representing the station 28 with ring object 60.

Moreover, the relationships among members of ring network 20 may be established by selectively associating the portions of ring object 60. As an example, network element 24 may be connected to a specific connection by associating the corresponding network element object 68 with a span 88 representing the specific connection. As another example, station 28 may be connected to a specific connection by associating the corresponding station object 76 with a span representing the specific connection.

A component object may be associated with at least a portion of ring object 60 in any suitable manner. As an example, the component object may be mapped to the portion in a table. The table may be stored at any suitable place, for example, at network element 24 or other node.

Modifications, additions, or omissions may be made to model 50 without departing from the scope of the invention. Model 50 may include more, fewer, or other components. Additionally, the components may be arranged in any suitable manner without departing from the scope of the invention.

Figure 3:
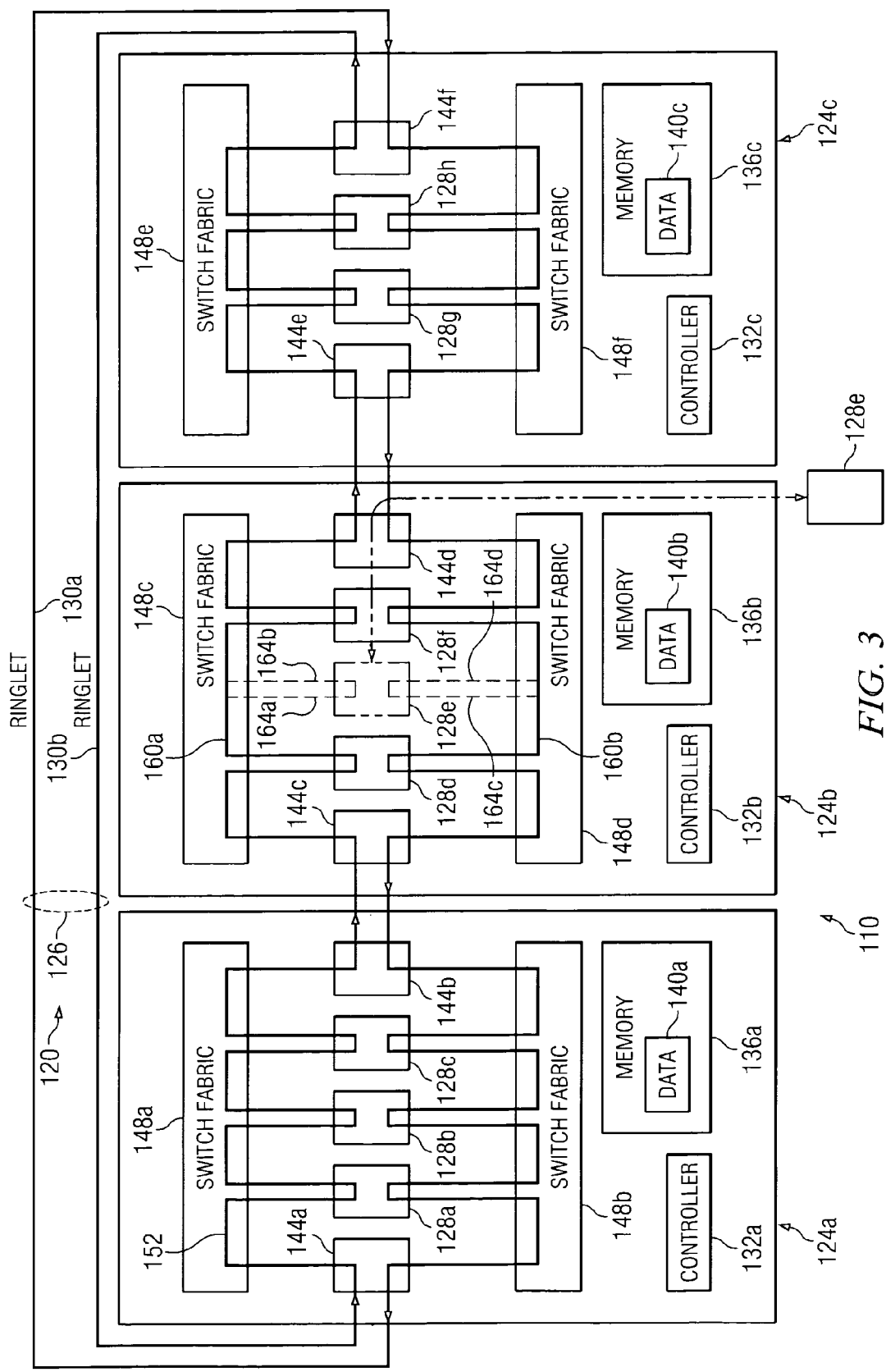
FIG. 3 is a block diagram of one embodiment of a network that includes a network element that has a controller that manages the connections of the network element.

FIG. 3 is a block diagram of one embodiment of a network 110 that includes a network element 124 that has a controller 132 that manages connections of the network element 124. According to the embodiment, controller 132 establishes if a connection initiation event has occurred, and manages connections of network element 124 in response to the event.

According to the illustrated embodiment, network 110 includes a ring network 120. Ring network 120 includes network elements 124 coupled by fibers 126. Ring network 120, network elements 124, and fibers 126 may be substantially similar to ring network 20, network elements 24, and fibers 26, respectively, of FIG. 1. Ring network 120 includes ringlets 130. A ringlet may refer to a fiber that traverses a ring in one direction. For example, ringlet 130a traverses ring network 120 in one direction, and ringlet 130b traverses ring network 120 in the opposite direction.

Network element 124 includes stations 128, a controller 132, memory 136, optical converters 144, and switch fabrics 148. Stations 128, controller 132, and memory 136 may be substantially similar to stations 28, controller 32, and memory 36, respectively, of FIG. 1. Optical converter 144 converts signals received from fiber 126 from an optical signal to an electrical signal, and converts a signal from network element 124 from an electrical signal to an optical signal. Switch fabric 148 directs signals received from a previous component to a next component. As an example, switch fabric 148a directs signals received from optical converter 144a to station 128a. As another example, switch fabric 148b may direct signal from station 128b to station 128a and a signal from station 128a to optical converter 144a.

Controller 132 establishes if a connection initiation event has occurred, and manages connections of the components of network element 124 in response to the event. Example components for which the connections may be managed include switch fabric 148, stations 128, optical controller 144, or other suitable component.

Memory 136 may store connection data 140. Connection data may refer to any suitable data structure, such as a data table, that records the connections between components of network element 124. As an example, connection data 140 may record connections among stations 128, switch fabrics 148, optical controllers 144, or any other suitable components.

Connection data 140 may include an entry for each connection, for example, an entry for a connection 152 from switch fabric 148a to station 128a. An entry may include a connection identifier and a path designation. A connection identifier of a connection uniquely identifies the connection. A path designation of a connection may provide the endpoints of the connection, for example, the ports at which the connection starts and ends.

To add a connection, controller 132 may add an entry corresponding to the connection to connection data 140. As an example, to add connection 152, controller 132a may add an entry to connection data 140. To delete a connection, controller 132 may delete the entry corresponding to the connection from connection data 140. As an example, to delete connection 152, controller 132a may delete the entry for connection 152.

Modifications, additions, or omissions may be made to network 110 without departing from the scope of the invention. The components of network 110 may be integrated or separated according to particular needs. Moreover, the operations of network 110 may be performed by more, fewer, or other devices. Additionally, operations of network 110 may be performed using any suitable logic.

FIG. 4 is a flowchart illustrating one embodiment of a method of managing connections in response to the addition of a component to a network element. According to the embodiment, controller 132b of FIG. 3 manages connections in response to the addition of station 128e.

The method begins at step 210, where controller 132b detects the addition of a station 128e. Controller 132b may detect the addition of the station 128e by detecting that the interfaces of station 128e have been coupled to appropriate interfaces of network element 124b. Initial provisioning is performed at step 214. Initial provisioning may include, for example, determining if the station 128e is allowed to be coupled to network element 124b. The initial provisioning may also include identifying the ring object to which the station 128e belongs.

Bypass connections are deleted at step 218. A bypass connection may refer to a connection that bypasses a station. According to the illustrated example, connections 160a-b bypass station 128e. Controller 132b may delete bypass connections 160a-b by deleting entries corresponding to bypass connections 160a-b from connection data 140b.

Pass-through connections are created at step 222. A pass-through connection may refer to a connection that passes through a station 128 and allows the station 128 to route packets. According to the illustrated embodiment, pass-through connections 164a-d allow station 128e to route signals. Controller 132b may create pass-through connections 164a-d by adding entries corresponding to pass-through connections 164a-d to connection data 140b. Provisioning is terminated at step 226. After terminating the provisioning, the method terminates.

Modifications, additions, or omissions may be made to the method without departing from the scope of the invention. The method may include more, fewer, or other steps. Additionally, steps may be performed in any suitable order without departing from the scope of the invention.

FIG. 5 is a flowchart illustrating one embodiment of a method of managing connections in response to the removal of a component to a network element. According to the embodiment, controller 132b of FIG. 3 manages connections in response to the removal of station 128e.

The method begins at step 310, where controller 132 detects the removal of station 128e. Controller 132b may detect the removal of station 128e by detecting that the interfaces of station 128e have been decoupled from interfaces of network element 124b. Alternatively, controller 132b may detect the removal of station 128e by determining that station 128e can no longer properly route signals.

Pass-through connections are deleted at step 318. According to the illustrated embodiment, pass-through connections 164a-d allow station 128b to route signals. Controller 132b may delete pass-through connections 164a-d by deleting the entries for pass-through connections 164a-d from connection data 140a. Bypass connections are created at step 322. According to the illustrated embodiment, bypass connections 160a-b bypass station 128b. Controller 132b may create bypass connections 160a-b by adding entries for the bypass connections 160a-b to connection data 140b. Provisioning is terminated at step 326. After provisioning is terminated, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a ring network may be modeled by a ring object that is stored at a node of the ring network. Modeling a ring network by a ring object may provide for more efficient provisioning of network elements. In addition, the ring object may provide for more efficient identification of problems with the ring network. Furthermore, the ring object may provide for more efficient gathering and reporting of statistics describing the ring network.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method comprising:
   creating a ring object modeling a ring network of a network system, the network system comprising a plurality of network elements, each network element comprising a gateway, the ring network configured to communicate a plurality of packets, each network element comprising a plurality of components, the ring object comprising a plurality of provisioning properties, a provisioning property describing configuring a component to become a member of the ring network;
   associating the component with the ring object to allow the component to become a member of the ring network, the associated component allowed to receive the plurality of packets, the component associated with the ring object by:
   deleting from connection data one or more data entries that correspond to one or more bypass connections that bypass the component; and
   adding to the connection data one or more data entries that correspond to one or more pass-through connections that pass through the component to allow the component to receive the plurality of packets; and
   storing the ring object at memory of each network element.

2. The method of claim 1, further comprising:
   associating a next component of a next network element with a next ring object to allow the next component to become a member of the ring network; and
   storing the next ring object at the memory of the next network element.

3. The method of claim 1, wherein associating the component with the ring object to allow the component to become a member of the ring network further comprises:
   establishing a component object representing the component; and
   mapping the component object to the ring object.

4. The method of claim 1, wherein associating the component with the ring object to allow the component to become a member of the ring network further comprises:
   establishing a component object representing the component; and
   mapping the component object to a member object of the ring object, the member object representing a member of the ring network.

5. The method of claim 1, further comprising:
   establishing a failure of the component; and
   reporting the failure associated with the ring object.

6. The method of claim 1, further comprising:
   gathering statistics describing the component; and
   reporting the statistics associated with the ring object.

7. A network element comprising:
   a memory configured to:
   store a ring object modeling a ring network of a network system, the network system comprising a plurality of network elements comprising the network element, each network element comprising a gateway, the ring network operable to communicate a plurality of packets, each network element comprising a plurality of components, the ring object comprising a plurality of provisioning properties, a provisioning property describing configuring a component to become a member of the ring network; and
   a controller coupled to the memory and configured to:
   associate the component with the ring object to allow the component to become a member of the ring network, the associated component allowed to receive the plurality of packets, the component associated with the ring object by:
   deleting from connection data one or more data entries that correspond to one or more bypass connections that bypass the component; and adding to the connection data one or more data entries that correspond to one or more pass-through connections that pass through the component to allow the component to receive the plurality of packets; and store the ring object at the memory of the network element, each network element configured to store the ring object.

8. The network component of claim 7, the controller further configured to:

associate a next component of a next network element with a next ring object to allow the next component to become a member of the ring network; and store the next ring object at the memory of the next network element.)

9. The network component of claim 7, the controller further configured to associate the component with the ring object to allow the component to become a member of the ring network by:

establishing a component object representing the component; and mapping the component object to the ring object.

10. The network component of claim 7, the controller further configured to associate the component with the ring object to allow the component to become a member of the ring network by:

establishing a component object representing the component; and mapping the component object to a member object of the ring object, the member object representing a member of the ring network.

11. The network component of claim 7, the controller further configured to:

establish a failure of the component; and report the failure associated with the ring object.

12. The network component of claim 7, the controller further configured to:

gather statistics describing the component; and report the statistics associated with the ring object.

13. One or more non-transitory computer-readable media storing logic when executed configured to:

create a ring object modeling a ring network of a network system, the network system comprising a plurality of network elements, each network element comprising a gateway, the ring network configured to communicate a plurality of packets, each network element comprising a plurality of components, the ring object comprising a plurality of provisioning properties, a provisioning property describing configuring a component to become a member of the ring network;

associate the component with the ring object to allow the component to become a member of the ring network, the associated component allowed to receive the plurality of packets, the component associated with the ring object by:

deleting from connection data one or more data entries that correspond to one or more bypass connections that bypass the component; and adding to the connection data one or more data entries that correspond to one or more pass-through connections that pass through the component to allow the component to receive the plurality of packets; and store the ring object at memory of each network element.

14. The computer-readable media of claim 13, further configured to:

associate a next component of a next network element with a next ring object to allow the next component to become a member of the ring network; and store the next ring object at the memory of the next network element.

15. The computer-readable media of claim 13, further configured to associate the component with the ring object to allow the component to become a member of the ring network by:

establishing a component object representing the component; and mapping the component object to the ring object.

16. The computer-readable media of claim 13, further configured to associate the component with the ring object to allow the component to become a member of the ring network by:

establishing a component object representing the component; and mapping the component object to a member object of the ring object, the member object representing a member of the ring network.

17. The computer-readable media of claim 13, further configured to:

establish a failure of the component; and report the failure associated with the ring object.

18. The computer-readable media of claim 13, further configured to:

gather statistics describing the component; and report the statistics associated with the ring object.

19. A system comprising:

means for creating a ring object modeling a ring network of a network system, the network system comprising a plurality of network elements, each network element comprising a gateway, the ring network configured to communicate a plurality of packets, each network element comprising a plurality of components, the ring object comprising a plurality of provisioning properties, a provisioning property describing configuring a component to become a member of the ring network;

means for associating the component with the ring object to allow the component to become a member of the ring network, the associated component allowed to receive the plurality of packets, the means for associating a component with the ring object comprising:

means for deleting from connection data one or more data entries that correspond to one or more bypass connections that bypass the component; and means for adding to the connection data one or more data entries that correspond to one or more pass-through connections that pass through the component to allow the component to receive the plurality of packets; and means for storing the ring object at memory of each network element.

20. A method comprising:

creating a ring object modeling a ring network of a network system, the network system comprising a plurality of network elements, each network element comprising a gateway, the ring network configured to communicate a plurality of packets, each network element comprising a plurality of components, the ring object comprising a plurality of provisioning properties, a provisioning property describing configuring a component to become a member of the ring network;

associating a component with the ring object to allow the component to become a member of the ring network, the associated component allowed to receive the plurality of packets, the component associated with the ring object by:

deleting from connection data one or more data entries that correspond to one or more bypass connections that bypass the component;

adding to the connection data one or more data entries that correspond to one or more pass-through connections that pass through the component to allow the component to receive the plurality of packets;

establishing a component object representing the component;

mapping the component object to the ring object; and mapping the component object to a member object of the ring object, the member object representing a member of the ring network;

storing the ring object at memory of each network element;

associating a next component of a network element with a next ring object to allow the next component to become a member of the next ring network; and storing the next ring object at the memory of the network element;

establishing a failure of the component;

reporting the failure associated with the ring object;

gathering statistics describing the component; and reporting the statistics associated with the ring object.

* * * * *